US012799006B2

(12) United States Patent
Alghunaimi et al.

(10) Patent No.: US 12,799,006 B2
(45) Date of Patent: Nov. 17, 2026

(54) PRODUCTION OF BARIUM SULFATE FROM SEAWATER

(71) Applicant: SAUDI ARABIAN OIL COMPANY, Dhahran (SA)

(72) Inventors: Fahd I. Alghunaimi, Khobar (SA); Norah W. Aljuryyed, Dhahran (SA); Hind S. Aldossary, Dhahran (SA); Abadi A. Almutairi, Dhahran (SA); Noktan M. Alyami, Ad Dammam (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 466 days.

(21) Appl. No.: 18/191,380

(22) Filed: Mar. 28, 2023

(65) Prior Publication Data

US 2024/0327258 A1 Oct. 3, 2024

(51) Int. Cl.
*C02F 1/52* (2023.01)
*B01D 21/01* (2006.01)
(Continued)

(52) U.S. Cl.
CPC ............ *C02F 1/5245* (2013.01); *B01D 21/01* (2013.01); *C01F 11/462* (2013.01); *B01D 21/02* (2013.01);
(Continued)

(58) Field of Classification Search
None
See application file for complete search history.

(56) References Cited

U.S. PATENT DOCUMENTS 3,974,039 A * 8/1976 Frohner .................. C02F 1/042 159/DIG. 13
4,392,959 A * 7/1983 Coillet ................. B01D 61/026 210/651
(Continued)

FOREIGN PATENT DOCUMENTS

CN 1345587 A 4/2002
CN 101759202 B 1/2012
(Continued)

OTHER PUBLICATIONS

Hou et al. ("Sulfate Ion Removal from Seawater for Hydraulic Fracturing by Barium Sulfate Precipitation", published online on Mar. 7, 2023, Abstract, p. 1). (Year: 2023) accessed at https://onepetro.org/SPEMEOS/proceedings-abstract/23MEOS/2-23MEOS/517228.*
(Continued)

*Primary Examiner* — Clare M Perrin
(74) *Attorney, Agent, or Firm* — Osha Bergman Watanabe & Burton LLP

(57) ABSTRACT

A method of producing barium sulfate with a barium sulfate production system includes introducing an amount of a sulfate contaminated water to an agitation unit of the barium sulfate production system, introducing an amount of a barium source to the agitation unit, thereby forming a treatment mixture, and agitation the treatment mixture to promote ion association between barium cations from the barium source and sulfate anions, thereby producing a barium sulfate precipitate and a treated water. A barium sulfate production system includes an agitation unit in fluid connection with an aqueous fluid feed line, a treated fluid outlet and a precipitate outlet, a sulfate contaminated water unit in fluid connection with the aqueous fluid feed line, and a barium source.

18 Claims, 5 Drawing Sheets

(51) Int. Cl.

| | |
|---|---|
| ***C01F 11/46*** | (2006.01) |
| *B01D 21/02* | (2006.01) |
| *C02F 101/10* | (2006.01) |
| *C02F 103/08* | (2006.01) |

(52) U.S. Cl.
CPC ...... *C01P 2002/74* (2013.01); *C01P 2006/80* (2013.01); *C02F 2101/101* (2013.01); *C02F 2103/08* (2013.01); *C02F 2303/18* (2013.01)

(56) References Cited

U.S. PATENT DOCUMENTS

| | | | | |
|---|---|---|---|---|
| 4,894,093 | A | 1/1990 | Aderhold et al. | |
| 4,895,665 | A * | 1/1990 | Colelli | E21B 21/068 210/717 |
| 5,454,916 | A * | 10/1995 | Iwata | C02F 1/4604 210/744 |
| 7,776,149 | B2 | 8/2010 | Amirzadeh-Asl et al. | |
| 9,505,639 | B2 | 11/2016 | Fazrie et al. | |
| 9,643,865 | B2 | 5/2017 | Matherly et al. | |
| 10,501,680 | B2 | 12/2019 | Li et al. | |
| 2005/0180912 | A1 * | 8/2005 | Amirzadeh-Asl | C01F 11/462 423/554 |
| 2019/0225867 | A1 * | 7/2019 | Li | E21B 43/26 |

FOREIGN PATENT DOCUMENTS

| | | | |
|---|---|---|---|
| CN | 103274550 | B | 9/2014 |
| CN | 115159746 | A | 10/2022 |
| RU | 2593877 | C2 | 8/2016 |
| WO | 2022203531 | A1 | 9/2022 |

OTHER PUBLICATIONS

Bustos-Flores, Elvis, et al., "Thermodynamic and experimental studies on removal of calcium and sulfate ions from recycling water of complex sulfide flotation operations", Transactions of Nonferrous Metals Society of China, ScienceDirect, Elsevier, vol. 31, 2021, pp. 3116-3127 (12 pages).

Johnson, Craig A., et al., "Barite (Barium)", Chapter D of Critical Mineral Resources of the United States-Economic and Environmental Geology and Prospects for Future Supply, USGS Science for a Changing World, Eds. Klaus J. Schulz, et al., U.S. Department of the Interior and U.S. Geological Survey, 2017 (30 pages).

Mucci, Alfonso, "A potentiometric back-titration method for determining sulfate in seawater and marine pore waters", Limno. Oceanogr., American Society of Limnology and Oceanography, Inc., vol. 36, Issue. 2, 1991, pp. 409-412 (4 pages).

Wang, Chunyao, et al., "Morphology of Barite Synthesized by In-Situ Mixing of Na2SO4 and BaCI2 Solutions at 200° C", Crystals, MDPI, vol. 11, No. 962, 2021, pp. 1-16 (16 pages).

* cited by examiner

PRODUCTION OF BARIUM SULFATE FROM SEAWATER

BACKGROUND

Oil and gas reservoir applications have recently shifted to using available seawater for various applications over growing concerns of lack of freshwater sources. Hydraulic fracturing, for example, can require millions of gallons of water per treatment. When an untreated seawater is injected downhole, the dissolved sulfate ions in seawater may react with compounds present in rock, formation brine, injection fluids, and produced fluids that produce a sulfate scale. In such instances, the formation of sulfate scale and sulfate scale deposition indicates the incompatibility of the seawater for oil and gas production applications. This sulfate scale (or "sulfate precipitate") formation and deposition may occur in the wellbore or near the wellbore area, and it often causes formation damage that may offset the performance of drilling, production, and recovery applications. In addition, sulfate ions introduced to the well can lead to toxic hydrogen sulfide ($H_2S$) production. Thus, costly treatment methods, such as nanofiltration have been aimed at reducing sulfate levels to prevent these effects.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of producing barium sulfate with a barium sulfate production system. The method includes introducing an amount of a sulfate contaminated water to an agitation unit of the barium sulfate production system via an aqueous fluid feed line in fluid connection with the agitation unit, which includes a treated fluid outlet line and a precipitate outlet. The method also includes introducing an amount of a barium source to the agitation unit thereby forming a treatment mixture, and agitation the treatment mixture to promote ion association between barium cations from the barium source and sulfate anions, thereby producing a barium sulfate precipitate and a treated water.

In another aspect, embodiments disclosed herein relate to a barium sulfate production system that includes an agitation unit in fluid connection with an aqueous fluid feed line, a treated fluid outlet and a precipitate outlet, a sulfate contaminated water unit in fluid connection with the aqueous fluid feed line, and a barium source.

Any combinations of the various embodiments and implementations disclosed herein can be used in a further embodiment, consistent with the disclosure. Other aspects and advantages of the claimed subject matter will be apparent from the following description and the appended claims.

DETAILED DESCRIPTION

Figure 1:
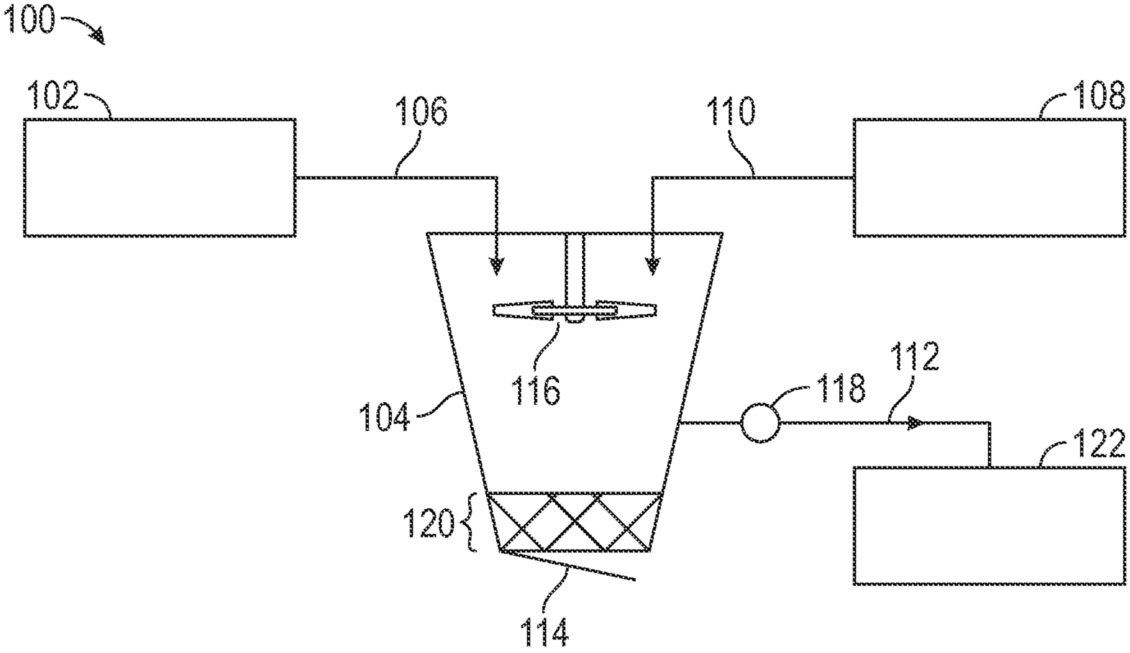
FIG. 1 is a schematic of a barium sulfate ($BaSO_4$) production system in accordance with one or more embodiments.

In instances where a sulfate contaminated water, such as seawater, is used in oil and gas operations, scale formation may occur. A sulfate contaminated water containing sulfates above a threshold level, such as 500 parts per million (ppm), may cause sulfate scale deposits (or sulfate precipitates) to form in or around oil and gas reservoirs upon contact with a precipitating agent. For example, an untreated seawater, such as an Arabian Gulf seawater, often includes a high sulfate content. Such seawater may have at least 5000 ppm (parts per million) of sulfates. This high sulfate content requires various water treatment methods to improve water quality for different applications. Seawater may be treated for applications such as irrigation, drinking water, or for a base fluid in the oil and gas industry.

Current technologies used for removal of sulfates from seawater include nanofiltration, ion exchange and chemical precipitations with alkaline earth metal cations, such as calcium, barium or strontium. Among these technologies, chemical precipitations are cost-effective and efficient, and often do not require a large energy input. The precipitated particles are usually considered a waste product to be disposed rather than obtaining in sufficient purity to be used in further applications.

Barite (or "barium sulfate," $BaSO_4$) is traditionally produced using mining techniques. In particular, after the barite is mined, it goes through an extensive process to separate barite from the ore. Sometimes, more complex methods are used for isolation and purification of barite, such as heavy media separation and magnetic separation. In these instances, separation of the mined barite from impurities require specialized equipment and facilities. In effect, there remains a need to provide a simultaneous treatment of sulfate contaminated water and selective formation of a barium sulfate ($BaSO_4$) precipitate that may be used in other applications.

One or more embodiments of the present disclosure relate to a $BaSO_4$ precipitation system and method to produce barium sulfate from sulfate contaminated water. In one or more embodiments, the $BaSO_4$ produced by a method and/or system described herein is used in a variety of oil and gas applications, such as coating materials, a component in drilling fluid, in alloy manufacturing, as a feedstock for chemical manufacturing, an additive for friction material, in paints and plastics, among others. Thus, one or more embodiments relate to the formation of barium sulfate for use in various applications.

In one or more embodiments, the removal of sulfate ions from the sulfate contaminated water prior to use of the sulfate contaminated water in an oilfield operation can help prevent scale formation, which reduces damage to the subterranean zone and enables larger amounts of hydrocarbons to be accessed. In such embodiments, the use of a barium source to treat sulfate contaminated water such that the sulfate concentration decreases and provides the advantage of using a sulfate contaminated water source (e.g., seawater)

in oil and gas operations. In such cases, the use of seawater may address the shortage of water supply in on-site oil and gas reservoir.

The term "sulfate contaminated water" is defined as any aqueous fluid that includes a sulfate concentration of at least 1000 ppm of sulfate. The sulfate contaminated water of one or more embodiments may be tested to determine the sulfate concentration prior to treatment. The sulfate contaminated water may include a base fluid of at least one of freshwater, seawater brine, water soluble organic compounds, water-insoluble materials, and mixtures thereof produced from a reservoir. The sulfate contaminated water may contain wastewater containing various salts. Salts that may be found in the sulfate contaminated water may include sodium, calcium, aluminum, magnesium, potassium, strontium, and lithium salts of halides, carbonates, chlorates, bromates, nitrates, oxides, phosphates, among others.

In some embodiments, the sulfate contaminated water is a seawater. The term "seawater" is defined as any aqueous fluid that is obtained from a natural water bearing source that is not a freshwater source. The salinity, dissolved solids, and pH can vary from one seawater source to another seawater source. In one or more embodiments, the sulfated seawater may be a seawater that has undergone a preliminary treatment. Such preliminary treatments include a processing to remove contaminants, such as nanofiltration to reduce sulfate concentrations. The seawater of one or more embodiments may be tested to determine the sulfate concentration prior to treatment, after treatment, or both.

The salinity, oil content, total dissolved solids, and pH of the sulfate contaminated water can vary from one sulfate contaminated water source to another. The term "total dissolved solids" or "TDS" means a measure of the dissolved combined content of all inorganic and organic substances present in a liquid in molecular, ionized, or micro-granular (colloidal sol) suspended form. Unless indicated otherwise, TDS concentrations are reported in parts per million (ppm). In one or more embodiments, the produced water may have a total dissolved solids content in an amount of at least 55,000 ppm, or at least 60,000 ppm, or at least 70,000 ppm, or at least 80,000 ppm, or at least 100,000 ppm, or at least 200,000 ppm.

In one or more embodiments, the sulfate contaminated water does not include a scale inhibitor. A scale inhibitor is any component that may be added to a fluid to delay, reduce, or prevent scale deposition on equipment or piping. Some non-limiting examples of scale inhibitors include acrylic acid polymers, maleic acid polymers, and phosphates. In some implementations, a salt is dissolved in the sulfate contaminated water to adjust a potential of hydrogen (pH) of the sulfate contaminated water. The pH of the sulfate contaminated water can be between 7 and 9. In some embodiments, a salt is dissolved in the sulfate contaminated water to increase the pH. For example, sodium bicarbonate ($NaHCO_3$) can be dissolved in the first precipitating solution to increase the pH of the first precipitating solution to approximately 7.

Barium Sulfate Production System

In one aspect, embodiments disclosed herein relates to a system for producing $BaSO_4$ by treating a sulfate contaminated water as described above. The $BaSO_4$ production system of one or more embodiments includes a sulfate contaminated water unit, an agitation unit, a barium source, and an agitation unit. A non-limiting example of a $BaSO_4$ production system 100 (or "production system 100") in accordance with one or more embodiments is shown in FIG. 1.

As shown in FIG. 1, the sulfate contaminated water unit 102 is in fluid connection with an agitation unit 104 via an aqueous fluid feed line 106. The production system 100 includes a barium source unit 108 comprising a barium source. As shown in FIG. 1, barium source unit 108 may be in fluid connection with agitation unit 104 via a precipitating agent feed line 110. The barium source unit 108 includes a barium source. The barium source is a compound or agent that provides one or more barium cations ($Ba^{2+}$). While the barium source unit 108 is shown in FIG. 1 as a unit included in the system, as will be appreciated by those skilled in the art, the barium source may be added manually rather than through a specific operational unit in the system.

In some embodiments, the barium source includes barium chloride ($BaCl_2$), barium chloride hydrate ($BaCl_2 \cdot xH_2O$), or both. The barium source may be in the form of a solid (e.g., a powder) or a liquid (e.g., a solution that includes dissolved $BaCl_2$).

As shown in FIG. 1, the $BaSO_4$ production system includes an agitation unit 104 in fluid connection with a treated fluid outlet 112 and a precipitate outlet 114. The agitation unit 104 is used to agitate, or mix, the components in the agitation unit to form a treatment mixture. In one or more embodiments, mixing the treatment mixture may be performed using a simple stirring mechanism, pumping a barium source into a seawater (or vice versa), or a more vigorous agitation method as known to one of ordinary skill. In one or more particular embodiments, the agitation unit 104 includes a mixing device 116. As shown in FIG. 1, the mixing device 116 is positioned on an inner surface of the agitation unit 104 such that the mixing device 116 mixes a treatment mixture including an amount of barium source and sulfate contaminated seawater.

In one or more particular embodiments, the mixing device 116 agitates the treatment mixture for a period of time to form a $BaSO_4$ precipitate. In such embodiments, a treated water (e.g., a desulfated seawater) is produced. Accordingly, the production system 100 may produce treated water having a sulfate ion concentration ranging from 0 to 200 ppm.

In one or more embodiments, the production system 100 is configured to separate $BaSO_4$ precipitate from a treated fluid. Referring back to FIG. 1, the treated fluid outlet 112 includes a pump 118 to remove treated fluid from the agitation unit 104 to a treated fluid collection unit 122. The treated fluid outlet 112 is disposed at a midpoint of the agitation unit 104 as shown in FIG. 1. In such embodiments, pump 118 is located on the treated fluid outlet 112 is an output pump configured to separate the $BaSO_4$ precipitate 120 from the treated fluid. The pump 118 may be configured to separate the $BaSO_4$ precipitate having an average particle diameter of larger than about two microns. The precipitate having an average particle diameter larger than about two microns will gravitate to the bottom of the agitation unit 104.

While the treated fluid outlet is shown at the midpoint of the agitation unit 104 of FIG. 1, it may be positioned at any point along a side of the agitation unit 104, provided it is generally above the level at which solid precipitate collects at the bottom of the agitation unit 104.

A precipitate outlet 114 of the agitation unit 104 is configured to open upon the gravity-based collection of $BaSO_4$ precipitate and removal of the treated fluid. In one or more embodiments, the precipitate outlet is located at a bottom surface of the agitation unit and is configured to separate the $BaSO_4$ precipitate. The precipitate outlet 114 is configured to reversibly open and close such that the agitation unit 104 can be reused for further sulfate contaminated water treatment and $BaSO_4$ precipitation.

In some embodiments, the agitation unit 104 may be in fluid connection with a washing fluid collection unit (not shown) via a washing fluid outlet (not shown) that may be used to remove and collect the washing fluid after mixing with the $BaSO_4$ precipitate. The washing fluid collection unit may be the treated fluid collection unit 122. The washing fluid outlet may be the treated fluid outlet 112.

Method for Producing Barium Sulfate and a Treated Water

In another aspect, embodiments disclosed herein relate a method of producing $BaSO_4$ with a $BaSO_4$ production system as described above. In particular embodiments, the sulfated seawater, the barium source, or both may be received at a well site where the treated water is subsequently used, the $BaSO_4$ is subsequently used, or both.

The method may include producing $BaSO_4$ and a treated water from barium source and a sulfate contaminated water, introducing a sulfate contaminated water and barium source to a $BaSO_4$ production system as described above. The method of one or more embodiments may include mixing the sulfate contaminated water and a barium source to form a $BaSO_4$ precipitate and collecting the $BaSO_4$ precipitate. In one or more embodiments, the method includes using the produced $BaSO_4$ precipitate in one or more applications. The method may further include, after precipitating out sulfate from the sulfate contaminated water, mixing the treated water with an injection fluid for use in various oil and gas processes.

Figure 2:
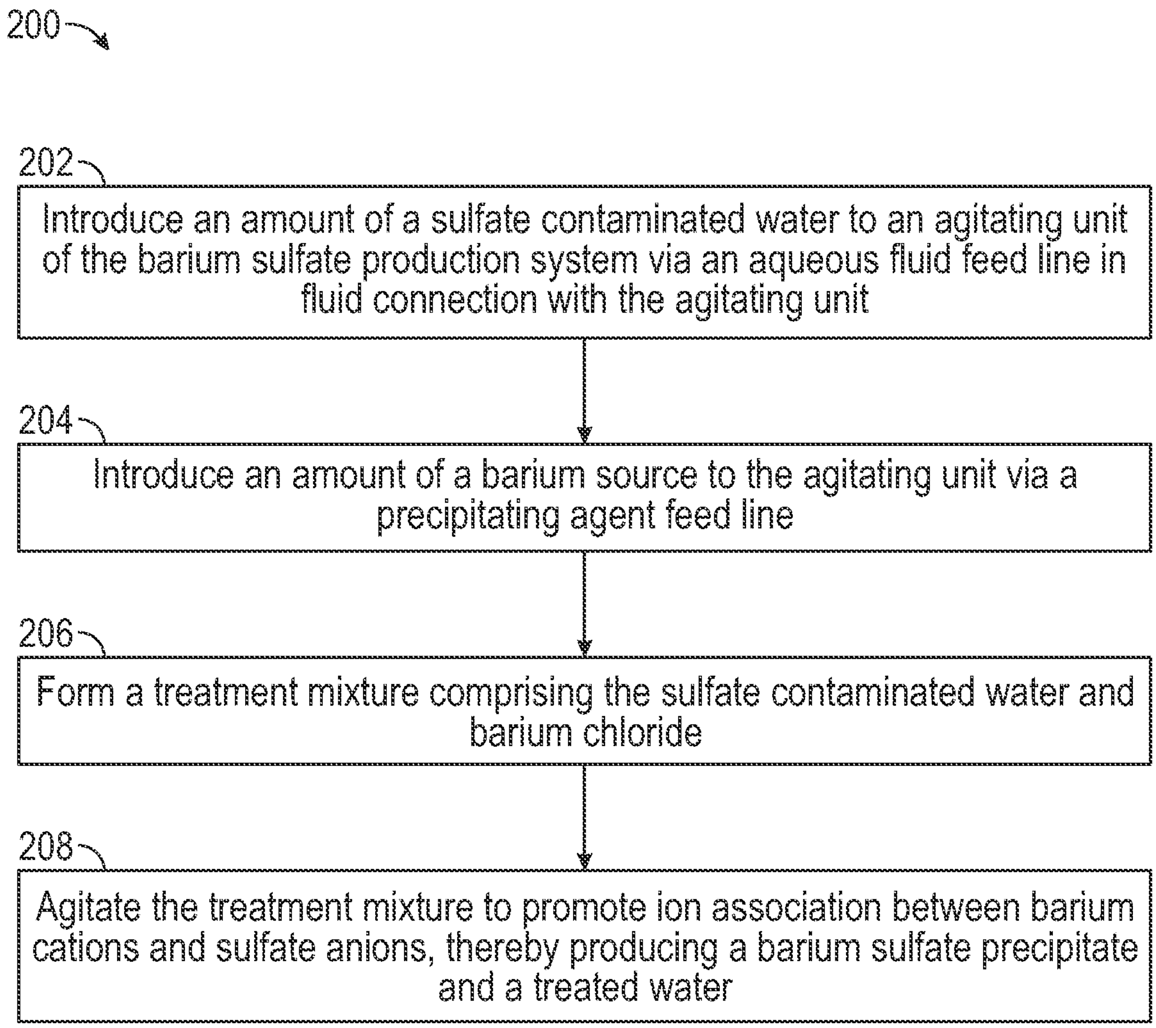
FIG. 2 is a method for producing $BaSO_4$ by treating a sulfate contaminated water with a barium sulfate production system in accordance with one or more embodiments.

A non-limiting method 200 for producing $BaSO_4$ by treating a sulfate contaminated water in accordance with one or more embodiments is shown in FIG. 2. The method 200 includes a step 202 of introducing a sulfate contaminated water to an agitation unit of a $BaSO_4$ production system as described above. The sulfate contaminated water may have a sulfate concentration of at least 1000 ppm as described above. The sulfate contaminated water may be an untreated sulfated seawater. In particular embodiments, the sulfate contaminated water is received at a well site in which the formation of sulfate precipitates, such as $BaSO_4$, may be detrimental to the well. In such embodiments, treatment of a sulfate contaminated seawater, injection of said treated seawater into a well, and a geologic formation treatment may be performed. In one or more embodiments, the sulfate contaminated water is tested prior to use to determine the sulfate concentration. In particular embodiments, a concentration of sulfates of the sulfate contaminated water may be determined prior to introducing the sulfate contaminated water to the agitation unit.

The method 200 also includes adding an amount of barium source to the agitation unit in step 204. The barium source may be as described above, such as barium chloride or a hydrate thereof. In some embodiments, the barium source is added to the agitation unit manually. In some embodiments, the barium source is added to the agitation unit automatically using a barium source unit and a precipitating agent feed line in fluid connection with the agitation unit as described above. In one or more embodiments, the barium source in the form of a powder is added to the agitation unit.

An amount of the barium source may be determined based on the sulfate concentration of the sulfate contaminated water. In one or more embodiments, the amount of a barium source added to the agitation unit 104 is determined based on the concentration of sulfates in a sulfate contaminated water. The amount of a barium source in kilograms (kg), such as a hydrate of barium chloride, necessary to promote formation of $BaSO_4$ and decrease the concentration of sulfates from the untreated seawater may be determined based on the molar ratios of Equations 1 and 2, below.

$$SO_4^{2-} + BaCl_2 \cdot xH_2O \rightarrow BaSO_4 + xCl^- + xH_2O \quad (1)$$

$$\frac{M_{BaCl_2 \cdot xH_2O} * \overline{M}_{Sulfate} * F * 158.98}{1000} \approx BaCl_2 \cdot xH_2O(\text{kg}) \quad (2)$$

where $M_{BaCl_2}$·$xH_2O$ is the molar mass of barium chloride hydrate ($BaCl_2 \cdot xH_2O$), $\overline{M}_{sulfate}$ is the molarity of sulfates in a sulfate contaminated seawater, and F refers to the amount of sulfate contaminated water in units of barrels of crude oil. In such embodiments, the molar ratio of barium cations of the barium source to sulfates are in a 1:1 ratio. In some embodiments, the molar ratio of barium cations of the barium source to sulfates are at least in a 1:1 ratio. The amount of barium source may be added such that the barium cations are in a molar excess to the sulfate anion concentration. In such embodiments, the excess barium cations can dissolve and remain in the treated sulfate contaminated water. In particular embodiments, the amount of barium source added to the sulfate contaminated water may include an amount in a range from ±10% standard deviation of the calculated value, ±5% standard deviation of the calculated value, or ±1% standard deviation of the calculated value.

A treatment mixture including the sulfate contaminated water and barium source is formed in the agitation unit in step 206. The addition of the barium source to the sulfate contaminated water of step 206 may yield a precipitate (e.g., $BaSO_4$) and a treated fluid from the treatment mixture.

In one or more embodiments, the barium source serves as a precipitating agent. In such embodiments, at least one precipitate is formed upon complexation with sulfate ions. Such a process may occur according to Equation 3, below.

$$Ba^{2+}_{(aq)} + SO^{2-}_{4(aq)} \rightarrow BaSO_{4(s)} \quad \text{Eqn. 3}$$

Molecular interactions between the precipitating agent and sulfate ions of the sulfated seawater may be promoted through agitating the mixture. As one of ordinary skill can appreciate, agitation, such as mechanical mixing, promotes molecular interactions, such as ion association of the precipitating agent with sulfates of the seawater. Ion association and complexation between sulfates and barium cations occurs such that the ionic association decreases the solubility of the resultant sulfate complex (e.g., $BaSO_4$) from aqueous solutions such that a solid precipitate and a treated water is formed via mixing the treated mixture.

In step 208, the treatment mixture is mixed by one or more components of the agitation unit to yield the $BaSO_4$ precipitate and the treated fluid. Agitating the treated mixture of step 208 may facilitate precipitation of sulfate anions from the sulfate contaminated water with barium cations of the barium source such that a precipitate is formed. In such embodiments, agitating the treatment mixture promotes ion association between barium cations and sulfate anions, thereby producing a $BaSO_4$ precipitate and a treated water.

As mentioned above, the agitation may be a simple stirring mechanism, pumping a precipitating agent, such as barium chloride, into a sulfate contaminated water (or vice versa), or a greater agitation as known to one of ordinary skill. In one or more embodiments, agitating the treatment mixture forms a treated fluid and a $BaSO_4$ precipitate. In such embodiments, a period of time for agitating the treatment mixture (i.e., precipitation time) such that a substantial amount of precipitate forms is from about 10 minutes to about 6 hours. In embodiments in which no agitation is performed, a precipitate formation may be extended to between about 1 to 3 days In some embodiments, the treated fluid is removed from the $BaSO_4$ precipitate via a treated fluid outlet (e.g., FIG. 1, treated fluid outlet 112). The treated fluid may be collected in a treated fluid collection unit via the treated fluid outlet. In such embodiments, a pump located on the treated fluid outlet pumps the treated fluid from the agitation unit to the treated fluid collection unit via the treated fluid outlet to separate the $BaSO_4$ precipitate from the treated fluid such that the $BaSO_4$ precipitate remains in the agitation unit.

In one or more embodiments, the remaining $BaSO_4$ precipitate may be washed with a non-sulfate contaminated fluid (e.g., a washing fluid) to remove impurities and/or co-precipitates from the $BaSO_4$ precipitate. In such embodiments, washing the $BaSO_4$ precipitate may occur in the agitation unit, where the washing fluid may be introduced to the agitation via one or more washing fluid inlet lines. The agitation unit may mix the washing fluid and the $BaSO_4$ precipitate for a period of time. In particular embodiments, the washing fluid may be separated from the $BaSO_4$ precipitate via the treated fluid outlet.

The $BaSO_4$ precipitate remaining in the agitation unit can be collected via a precipitate outlet of the agitation unit. In such embodiments, the precipitate outlet opens upon the gravity-based collection of $BaSO_4$ precipitate. The precipitate outlet reversibly opens and closes such that $BaSO_4$ precipitate is removed and the agitation unit can be reused for further sulfate contaminated water treatment and $BaSO_4$ precipitation.

In one or more embodiments, the one or more substances of the TDS of the sulfate contaminated water do not co-precipitate with the $BaSO_4$ precipitate. In one or more embodiments, one or more substances of the TDS present in the sulfate contaminated water co-precipitate with the $BaSO_4$ precipitate in an amount of 10 wt % or less based on the total weight of the produced barium sulfate precipitate. In one or more embodiments, the barium sulfate precipitate includes impurities in an amount of about 10% by weight (10 wt %) or less, based on the total weight of the produced barium sulfate precipitate, as determined by powder X-ray diffraction. In one or more embodiments, the barium sulfate precipitate includes impurities in an amount of about 7.5 wt % or less, about 5 wt % or less, about 3 wt % or less, about 2.5 wt % or less, about 2 wt % or less, about 1 wt % or less, or about 0.5 wt % or less, based on the total weight of the produced barium sulfate precipitate. In one or more embodiments, the barium sulfate precipitate includes 10 wt % or less of halite (sodium chloride) as determined by powder X-ray diffraction.

In order to avoid detrimental scale formation in further applications of the treated fluid, the sulfate concentration in the treated fluid should be below a threshold concentration prior to use in oil and gas operations. As described above, sulfate scale may form in downhole equipment when injection fluids that include an amount of 500 ppm sulfates or more encounter downhole chemicals and conditions. In one or more embodiments, the concentration of sulfates of the treated fluid is above a threshold concentration and lower than a solubility limit of sulfate ions. The treated fluid of one or more embodiments may have a sulfate content above the threshold concentration, such that further treatment is required. In such embodiments, the sulfate concentration is at least 500 ppm of sulfate ions. In such embodiments, the treated fluid is recycled back to the agitation unit for further sulfate precipitation treatment to decrease the sulfate concentration.

In one or more embodiments, the threshold level of sulfates is below a level of 500 ppm of sulfate ions. The threshold level of sulfates may be below a level of 100 ppm of sulfate ions. In such embodiments, the treated fluid having sulfates below the threshold level may be used as in oil and gas operations, such as an injection fluid, a fracturing fluid, and a fluid for treating an oil and gas reservoir, such as a base fluid of an injection fluid.

In order to determine whether the treated fluid from the treatment mixture may be used in oil and gas operations, after the precipitated sulfate has been separated from the treatment mixture, a sulfate ion concentration of the treated fluid may be measured. As one of ordinary skill in the art may appreciate, a method of measuring the sulfate ion concentration may include geochemical analyses, such as ion chromatography.

As one of ordinary skill of the art may appreciate, the treated fluid produced from the systems and methods described herein may be used for any number of oil and gas operations. Such operations may include enhanced oil recovery, matrix stimulation, fracturing and drilling, among others. A particular embodiment is described in FIG. 3, in which sulfate contaminated water treatment (e.g., seawater treatment) and $BaSO_4$ production is described in combination with a fracturing operation.

Figure 3:
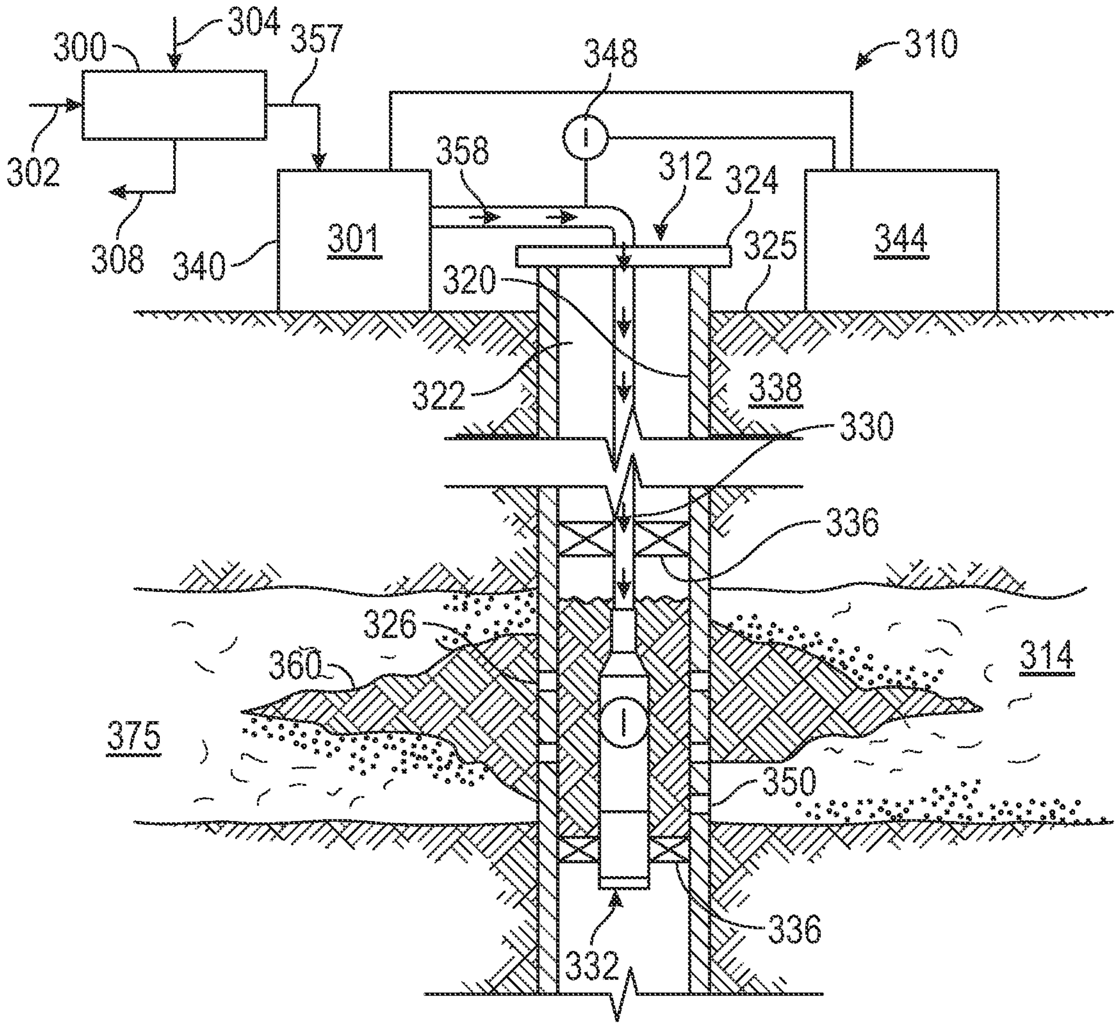
FIG. 3 is a schematic of a sulfate contaminated water treatment and $BaSO_4$ production is described in combination with a fracturing operation in accordance with one or more embodiments.

FIG. 3 illustrates an example of a reservoir treatment 310 for a well 312. The well 312 may be in a wellbore 320 formed in a subterranean zone 314 of a geological formation in the Earth's crust. The subterranean zone 314 may include, for example, a formation, a portion of a formation, or multiple formations in a hydrocarbon-bearing reservoir from which recovery operations can be practiced to recover trapped hydrocarbons. In some implementations, the subterranean zone 314 includes an underground formation of naturally fractured rock containing hydrocarbons (for example, oil, gas, or both). In some embodiments, the well 312 may intersect other suitable types of formations, including reservoirs that are not naturally fractured in any significant amount.

The well 312 can include one or more instrument trucks 344, one or more surface sensors 348, one or more downhole sensors 350, a casing 322 and well head 324. The wellbore 320 may be a vertical, horizontal, deviated, or multilateral bore. Perforations 326 may be present in the casing 322 to allow for flow of oil, gas, byproduct, or combinations thereof into the well. The casing 322 may be cemented or otherwise suitably secured in the wellbore 320. For a reservoir treatment 310, a work string 330 can be disposed in the wellbore 320. The work string 330 may be coiled tubing, sectioned pipe, or other suitable tubing. A drilling tool 332 may be coupled to an end of the work string 330. Packers 336 may seal an annulus 338 of the wellbore 320 uphole of and downhole of the subterranean zone 314.

One or more pump trucks 340 with one or more pump controls 301 may be coupled to the work string 330 at the surface 325. The pump trucks 340 pump fracture fluid 358 down the work string 330 to perform the reservoir treatment 310 and generate the fracture 360. The fracture 360 is generated in the rock 375 of the subterranean zone 314. The fracture fluid 358 may include a fluid pad, proppants, flush fluid, or a combination of these components. The fracture fluid 358 may include a treated water 357 (e.g., a seawater treated to reduce the concentration of sulfates), as discussed above. The pump trucks 340 may include mobile vehicles, equipment such as skids, or other suitable structures.

In one or more embodiments, the reservoir treatment 310 includes a barium sulfate ($BaSO_4$) production system 300 (or "system 300") that receives and treats a sulfate contaminated water 302, such as seawater, to give the treated water 357 as a base fluid in the treatment fluid 358. In implementations, the system 300 processes a sulfate contaminated water having a sulfate concentration of at least 1000 ppm as described above. In certain examples, the sulfate contaminated water received is untreated seawater or does not have a scale inhibitor. Further, the system 300 may be configured to receive a sulfate contaminated water to incorporate with a barium source via a precipitating agent feed line 304.

In one or more embodiments, the $BaSO_4$ production system 300 includes equipment to produce $BaSO_4$ and remove the precipitated sulfate from the sulfate contaminated water 302 according to methods of the present disclosure. In operation, the $BaSO_4$ production system mixes a received sulfate contaminated water 302, such as seawater, to precipitate sulfates from the sulfate contaminated water 302 to produce $BaSO_4$ in the sulfated contaminated water 302. The produced $BaSO_4$ precipitates may be collected via precipitating outlet 308.

The treated water 357 may have a concentration of sulfate that is lower than a solubility level of sulfate in the treated water 357. In certain implementations, the treated water 357 has less than 500 ppm sulfate, less than 400 ppm sulfate, less than 300 ppm sulfate, less than 200 ppm, less than 100 ppm sulfate, or less than 90 ppm sulfate.

The $BaSO_4$ production system 300 may be as described above and include mixers, vessels, settling tanks, clarifiers, separators, pumps, piping, controls, and the like, to precipitate $BaSO_4$ and remove the precipitated $BaSO_4$ from the sulfate contaminated water 302. For example, the system 300 may include piping to receive sulfate contaminated water and provide the sulfate contaminated water to, for example, an agitation unit as described above. Furthermore, in certain embodiments, the agitation unit provides for the sulfate precipitate to migrate to the bottom of the agitation unit to be removed via an outlet on a bottom portion of the agitation after the remove. The system 300 may include a pump as a motive device for flow of the treated water 357 to the pump trucks 340, and so on.

EXAMPLES

Materials and Methods

Arabian Gulf Seawater and barium chloride hydrate ($BaCl_2 \cdot 2H_2O$) obtained from China were used for the examples described below. Concentrations of components of the untreated Arabian Gulf Seawater of Table 1 were determined prior to treatment.

The untreated seawater was combined with $BaCl_2 \cdot 2H_2O$ in a 1:1 molar ratio with the measure concentration of sulfate ions reacted to provide a treated fluid and $BaSO_4$ according to the net ionic Equation 4.

$$SO_4^{2-} + BaCl_2 \cdot 2H_2O \rightarrow BaSO_4 + 2Cl^- + xH_2O \quad (4)$$

Figure 4:
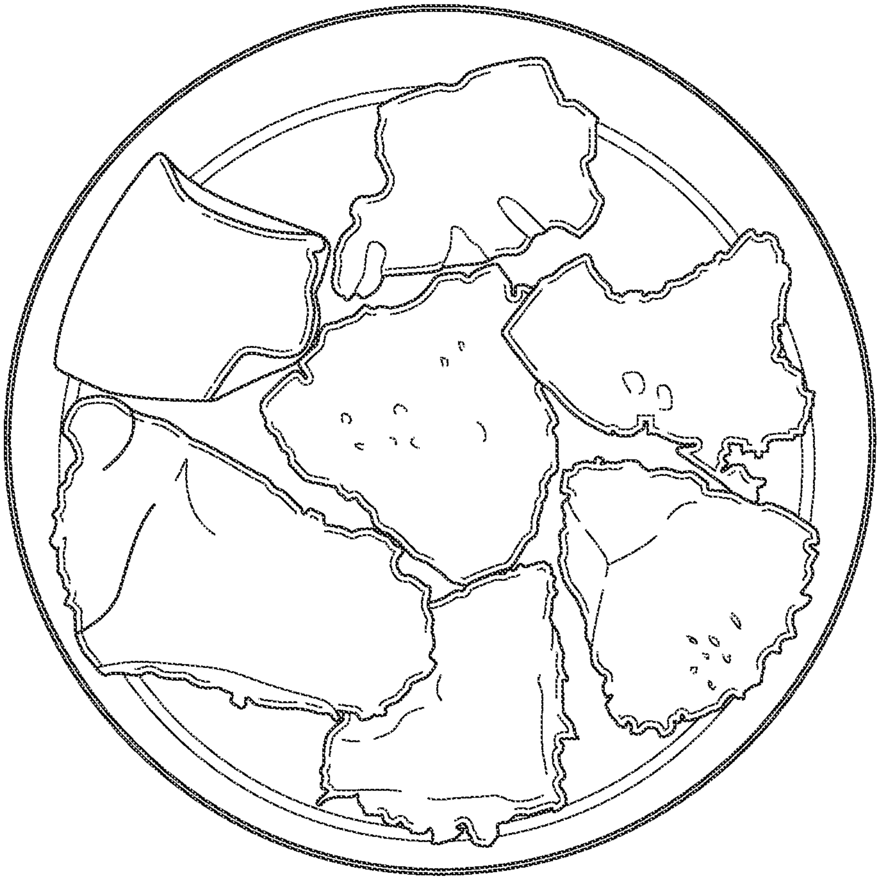
FIG. 4 is a dried sample of $BaSO_4$ precipitate obtained in accordance with one or more embodiments.

The $BaSO_4$ was then filtered, separated, washed with water. FIG. 4 is a sample $BaSO_4$ precipitate after collection and drying. This sample was homogenized and manually ground with a mortar and a pestle for several minutes to achieve a fine particle size. The fine powder was mounted onto an X-ray diffraction (XRD) sample holder via back pressing.

Figure 5:
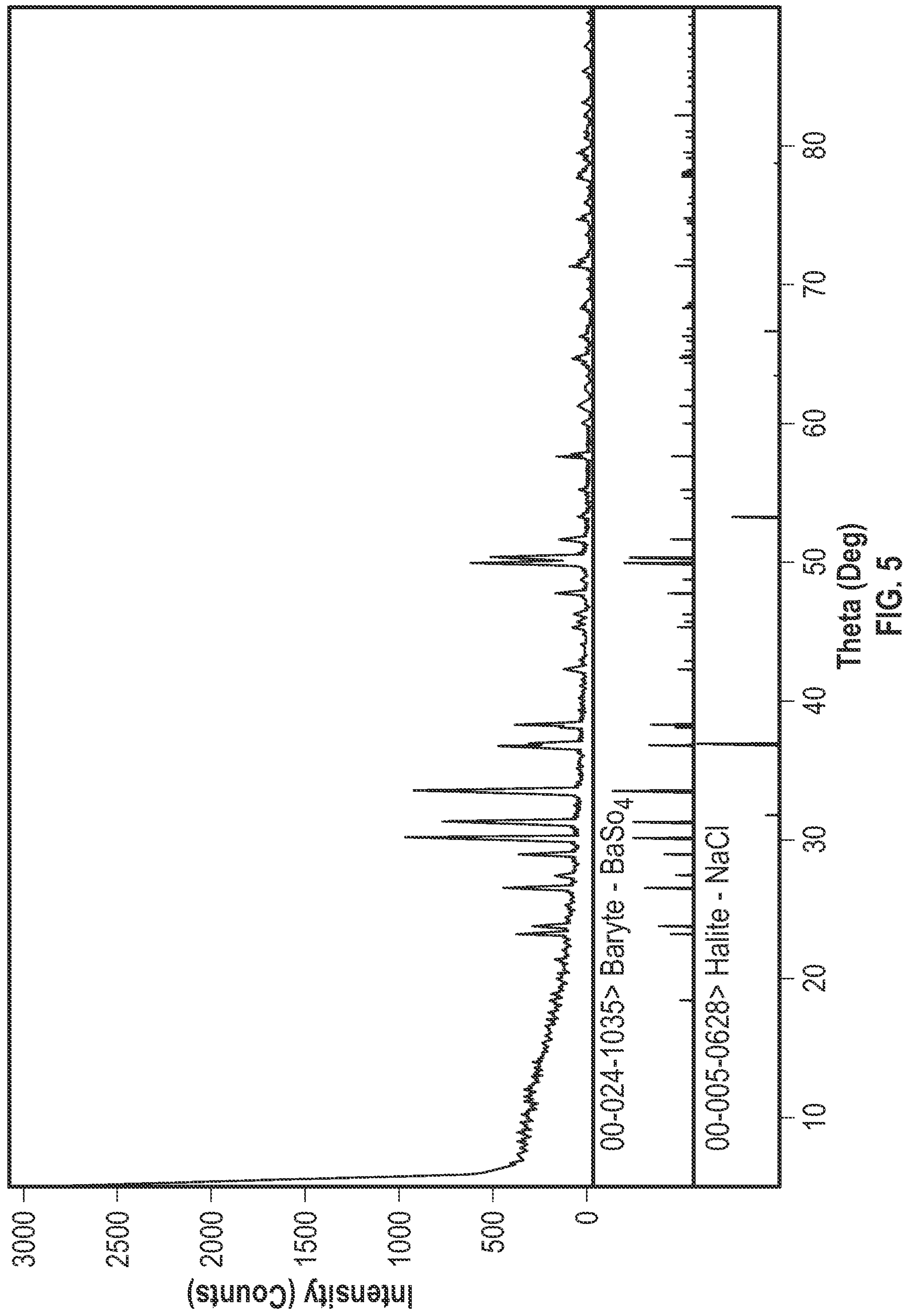
FIG. 5 is powder X-ray diffraction data obtained from analysis of a $BaSO_4$ sample obtained in accordance with one or more embodiments.

Then, the $BaSO_4$ sample was measured with a PANalytical X'Pert Pro MPD X-ray powder diffractometer equipped with a Cobalt X-ray tube. Powder XRD data were collected from 6° to 90° 2θ Bragg angles with a step size of 0.04° and counting time of 1° per minute. The identification of the XRD data of crystalline materials was conducted using Jade-09 software. The diffractogram with reference patterns of identified compounds is illustrated in FIG. 5. The sample consisted mainly of Baryte-BaSO4 with trace amount of halite-NaCl. Note that all the identified materials are the best-match with the patterns available in the International Centre for Diffraction Data (ICDD) database.

Additionally, components of the treated water were compared with measured concentrations of the untreated seawater as shown in in Table 1.

TABLE 1

Water Chemistry of Untreated Arabian Gulf Seawater and Treated Arabian Gulf Seawater

| Composition | Untreated Seawater (mg/L) | Treated Water (mg/L) |
|---|---|---|
| Barium ($Ba^{2+}$) | <1 | 4 |
| Calcium ($Ca^{2+}$) | 639 | 551 |
| Chloride ($Cl^-$) | 31401 | 34629.8 |
| Total Dissolved Solids | 58284 | 54085 |
| Magnesium ($Mg^{2+}$) | 2381 | 2049 |
| pH@25 C. | 7.8 | 7.1 |
| Potassium ($K^+$) | 739 | 729 |
| Sodium ($Na^+$) | 18758 | 16755 |
| Specific Gravity @ 60 F. | 1.0414 | 1.0409 |
| Strontium ($Sr^{2+}$) | 12 | 2 |
| Sulfate ($SO_4^{2-}$) | 5105 | <100 |

From the results in Table 1, the TDS concentration decreased from 58,284 mg/L in the untreated seawater to reach 54,085 mg/L in the treated water. Furthermore, divalent cations ($Ca^{2+}$, $Mg^{2+}$, $Sr^{2+}$) concentration also decreased in the treated water compared to the untreated seawater. Most importantly, the sulfate ion concentration was greatly reduced in the treated water. In particular, the concentration in treated water was less than 100 mg/L while it is 5,105 mg/L in untreated seawater. This indicates the current method allows for the application of mixing barium chloride with the high sulfate content sea water to produce relatively pure $BaSO_4$ and sulfate free water.

The term "substantially" as used in this disclosure refers to a majority of, or mostly, as in at least about 50 percent (%), 60%, 70%, 80%, 90%, 95%, 96%, 97%, 98%, 99%, 99.5%, 99.9%, 99.99%, or at least about 99.999% or more.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A method of producing barium sulfate with a barium sulfate production system, the method comprising:

introducing an amount of a sulfate contaminated water to the barium sulfate production system comprising:

an agitation unit of the barium sulfate production system that receives the sulfate contaminated water via an aqueous fluid feed line in fluid connection with the agitation unit, wherein the agitation unit comprises a mixing device positioned on an inner surface of the agitation unit, a treated fluid outlet, and a precipitate outlet, wherein the treated fluid outlet is disposed at a midpoint of the agitation unit and is disposed lower than the mixing device and wherein the precipitate outlet is located at a bottom surface of the agitation unit and reversibly opens and closes, and a barium source;

introducing an amount of the barium source to the agitation unit, thereby forming a treatment mixture comprising the sulfate contaminated water and barium chloride;

agitating the treatment mixture to promote ion association between barium cations from the barium source and sulfate anions, thereby producing a barium sulfate precipitate and a treated water, removing the treated water from the agitation unit via the treated fluid outlet, collecting the barium sulfate precipitate at the bottom surface of the agitation unit, and removing the barium sulfate precipitate from the agitation unit by opening the precipitate outlet upon gravity-based collection of the barium sulfate precipitate.

2. The method of producing barium sulfate of claim 1, wherein the sulfate contaminated water is seawater.

3. The method of producing barium sulfate of claim 1, further comprising producing a treated water with a sulfate concentration less than 500 ppm.

4. The method of producing barium sulfate of claim 1, further comprising producing the treated water with a sulfate concentration of less than 100 ppm.

5. The method of producing barium sulfate of claim 1, wherein the barium sulfate precipitate has less than 10 wt % impurities, based on the total weight of the barium sulfate precipitate, as determined by powder X-ray diffraction.

6. The method of producing barium sulfate of claim 1, further comprising:

washing the barium sulfate with a washing fluid; and removing the washing fluid via the treated fluid outlet.

7. The method of producing barium sulfate of claim 1, further comprising drying the barium sulfate precipitate.

8. The method of claim 1, further comprising prior to forming the treatment mixture, determining a concentration of sulfates of the sulfate contaminated water.

9. The method of claim 1, further comprising mixing the treated water with one or more additives to form an injection fluid for use in oil and gas applications.

10. The method of producing barium sulfate of claim 1, wherein a molar ratio of barium cations of the barium source to the sulfate anions are present in at least a 1:1 ratio in the treatment mixture.

11. A barium sulfate production system comprising:

an agitation unit in fluid connection with an aqueous fluid feed line, a treated fluid outlet and a precipitate outlet, wherein the treated fluid outlet is disposed at a midpoint of the agitation unit and is disposed lower than the mixing device and wherein the precipitate outlet is located at a bottom surface of the agitation unit and is configured to reversibly open and close, and wherein the agitation unit comprises a mixing device positioned on an inner surface of the agitation unit;

a sulfate contaminated water unit in fluid connection with the aqueous fluid feed line; and a barium source, wherein the system is configured to remove a barium sulfate precipitate from the agitation unit by opening the precipitate outlet upon gravity-based collection of the barium sulfate precipitate.

12. The barium sulfate production system of claim 11, wherein the precipitate outlet is configured to separate a barium sulfate precipitate.

13. The barium sulfate production system of claim 11, further comprising a treated fluid collection unit.

14. The barium sulfate production system of claim 11, wherein the treated fluid outlet comprises a fluid pump configured to pump a treated fluid from the agitation unit to a treated fluid collection unit.

15. The barium sulfate production system of claim 14, wherein the fluid pump comprises a filter.

16. The barium sulfate production system of claim 15, wherein the filter is configured to filter precipitates having an average diameter of at least two microns.

17. The barium sulfate production system of claim 11, further comprising a washing fluid inlet, a washing fluid outlet, a washing fluid collection unit, or any combination thereof.

18. The barium sulfate production system of claim 11, wherein the system is configured to produce a treated fluid via the treated fluid outlet.

* * * * *